US009342983B1

(12) United States Patent
Brener et al.

(10) Patent No.: US 9,342,983 B1
(45) Date of Patent: May 17, 2016

(54) USER INTERFACE FOR DRIVER PERFORMANCE APPLICATION

(71) Applicant: Greenroad Driving Technologies, Ltd., Beit-Dagan (IL)

(72) Inventors: Mark Brener, Kfar-Saba (IL); Eyal Khan, Ramat Gan (IL); Amir Shoval, Tel Aviv (IL)

(73) Assignee: Greenroad Driving Technologies Ltd., Beit Dagan (IL)

( * ) Notice: Subject to any disclaimer, the term of this patent is extended or adjusted under 35 U.S.C. 154(b) by 609 days.

(21) Appl. No.: 13/658,683

(22) Filed: Oct. 23, 2012

(51) Int. Cl.
*B60Q 1/00* (2006.01)
*G08G 1/01* (2006.01)

(52) U.S. Cl.
CPC .................. *G08G 1/0141* (2013.01)

(58) Field of Classification Search
CPC .......... G08G 1/0141; G08G 1/096741; G08G 1/096775; G08G 1/096716; G08G 1/0112; G08G 1/0129
USPC ................................. 340/439, 905
See application file for complete search history.

(56) References Cited

U.S. PATENT DOCUMENTS

| 4,500,868 | A | 2/1985 | Tokitsu et al. |
| 4,671,111 | A | 6/1987 | Lemelson |
| 5,270,708 | A | 12/1993 | Kamishima |
| 5,483,446 | A | 1/1996 | Momose et al. |
| 5,546,305 | A | 8/1996 | Kondo |
| 5,570,087 | A | 10/1996 | Lemelson |
| 5,805,079 | A | 9/1998 | Lemelson |
| 5,821,860 | A | 10/1998 | Yokoyama et al. |
| 5,892,434 | A | 4/1999 | Carlson |
| 6,060,989 | A | 5/2000 | Gehlot |
| 6,278,362 | B1 | 8/2001 | Yoshikawa et al. |
| 6,438,472 | B1 | 8/2002 | Tano et al. |
| 6,470,240 | B1 | 10/2002 | Haynes et al. |
| 6,556,905 | B1 | 4/2003 | Mittelsteadt et al. |
| 6,675,650 | B1* | 1/2004 | Paulo ..................... B60K 35/00 324/115 |
| 6,843,337 | B2 | 1/2005 | Matsubara et al. |
| 6,895,320 | B2 | 5/2005 | Bauer et al. |
| 7,389,178 | B2 | 6/2008 | Raz et al. |
| 7,561,054 | B2 | 7/2009 | Raz et al. |
| 7,925,426 | B2 | 4/2011 | Koebler et al. |
| 2002/0128751 | A1 | 9/2002 | Engstrom et al. |
| 2004/0153362 | A1 | 8/2004 | Bauer et al. |
| 2004/0236476 | A1 | 11/2004 | Chowdhary |
| 2005/0131597 | A1 | 6/2005 | Raz et al. |

(Continued)

FOREIGN PATENT DOCUMENTS

EP  1059508 A1  12/2000
EP  1 973 078 A1  3/2007

(Continued)

*Primary Examiner* — Ojiako Nwugo
(74) *Attorney, Agent, or Firm* — Dekel Patent Ltd.; David Klein

(57) ABSTRACT

A method, apparatus and a computer program product are described for providing visual presentation of driving related information, by detecting one or more driving events carried out by a driver of a moving vehicle; determining performance severity of the one or more driving events; classifying the one or more driving events according to pre-defined categories based on the respective performance severity of the one or more driving events; providing a visual presentation which comprises one or more concentric rings, and wherein the number of the concentric rings provides an indication that relates to recent driving performance of the driver.

14 Claims, 7 Drawing Sheets

(56) References Cited

U.S. PATENT DOCUMENTS

| | | |
|---|---|---|
| 2005/0137757 A1 | 6/2005 | Phelan et al. |
| 2006/0273657 A1 | 12/2006 | Wanke et al. |
| 2007/0001831 A1* | 1/2007 | Raz .................... B60R 16/0231 340/439 |
| 2010/0245064 A1 | 9/2010 | Fleishman et al. |
| 2011/0166773 A1 | 7/2011 | Raz et al. |
| 2011/0205044 A1 | 8/2011 | Enomoto et al. |
| 2011/0251752 A1* | 10/2011 | Delarocheliere ...... G07C 5/008 701/31.4 |
| 2011/0288743 A1 | 11/2011 | Smith |
| 2012/0280835 A1 | 11/2012 | Raz et al. |
| 2013/0018541 A1 | 1/2013 | Raz et al. |

FOREIGN PATENT DOCUMENTS

| | | |
|---|---|---|
| EP | 2 127 953 A1 | 12/2009 |
| WO | WO 2009/125178 A2 | 10/2009 |

* cited by examiner

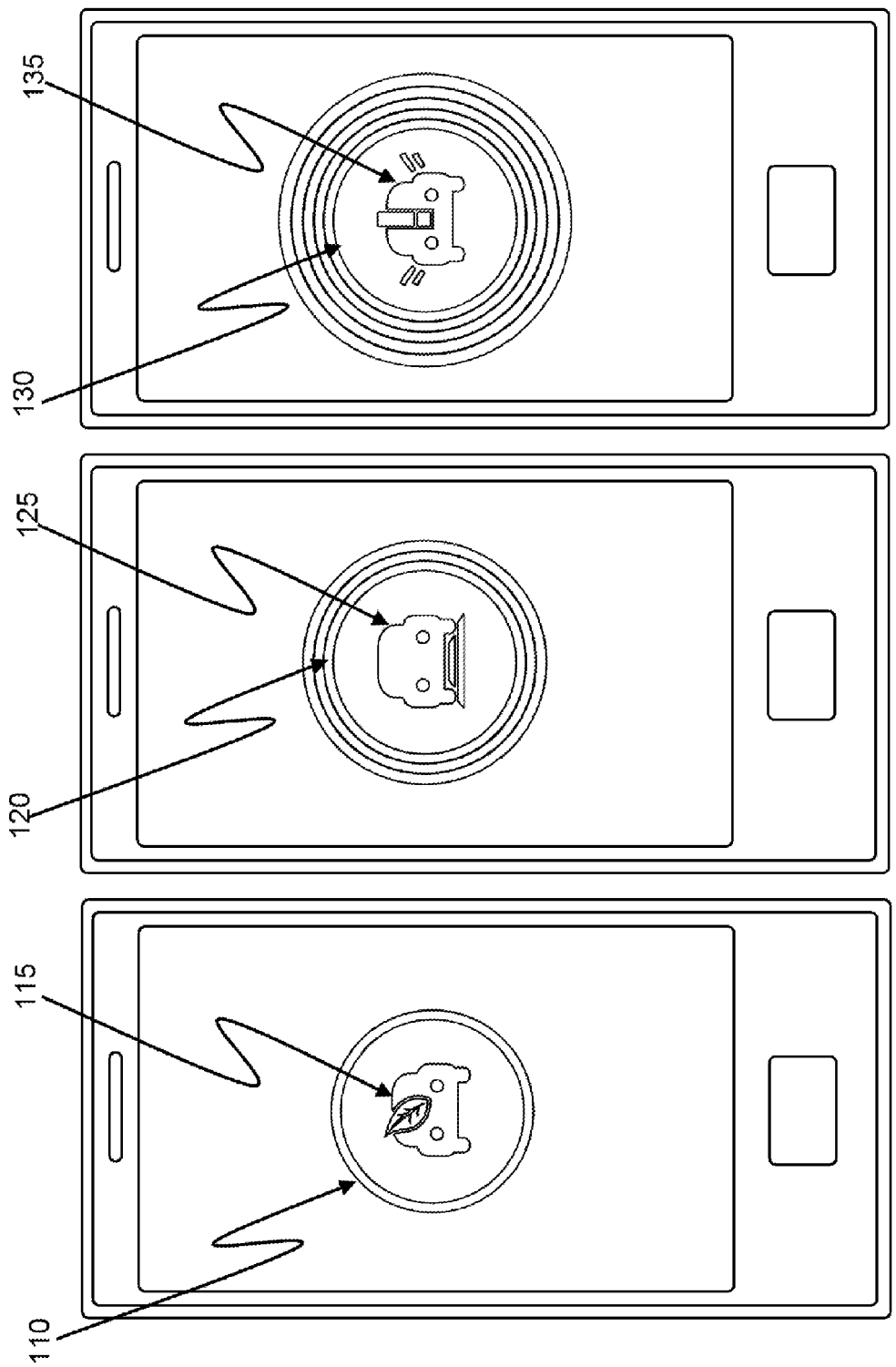

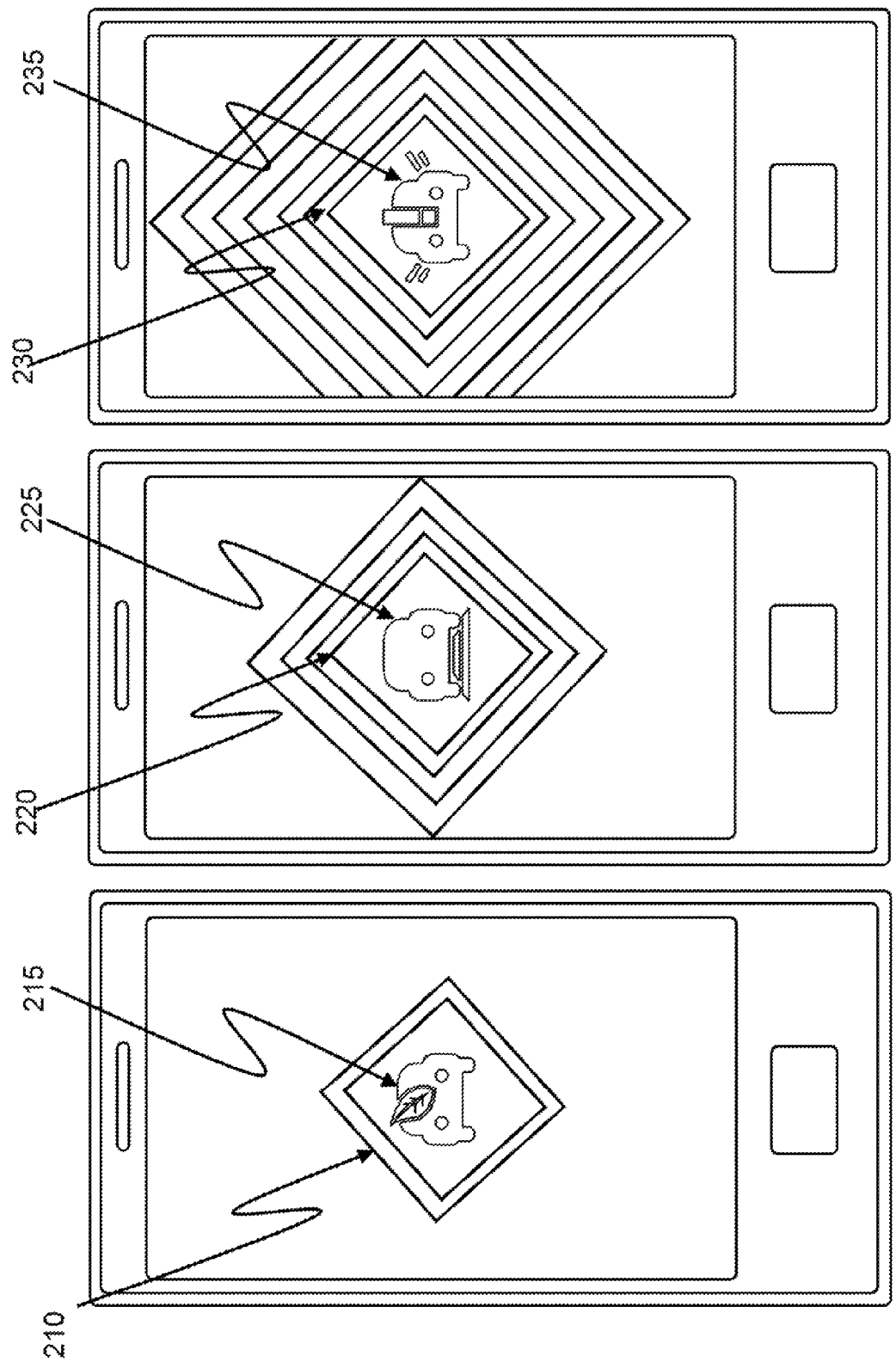

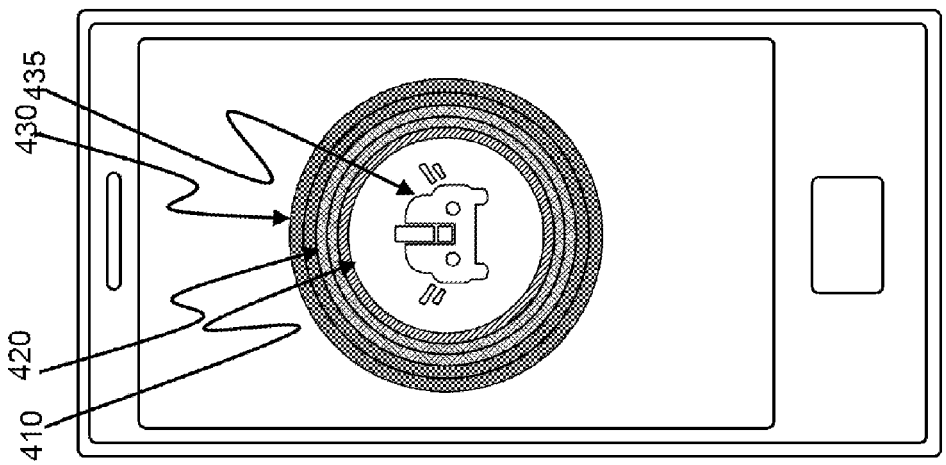
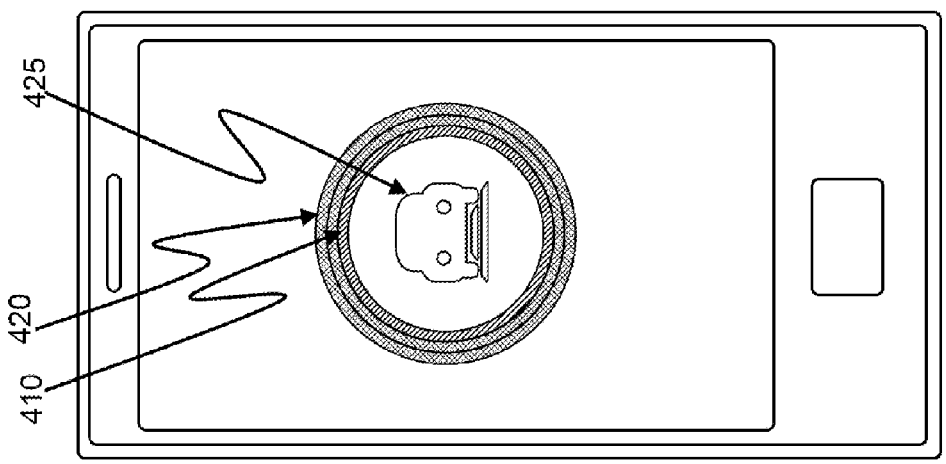
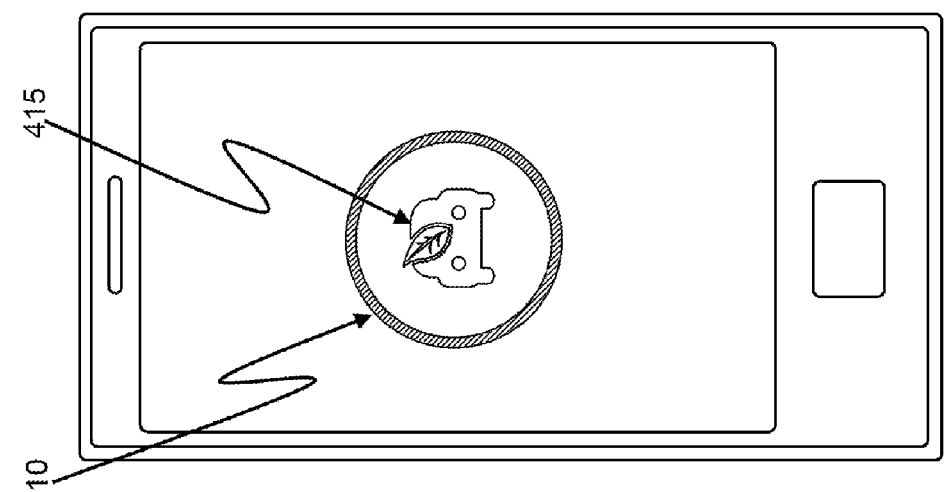
FIG. 4C
FIG. 4B
FIG. 4A

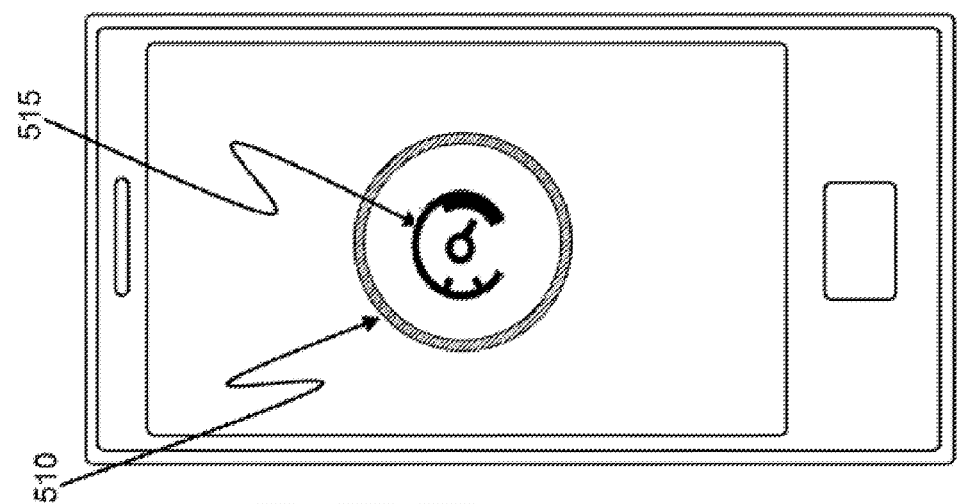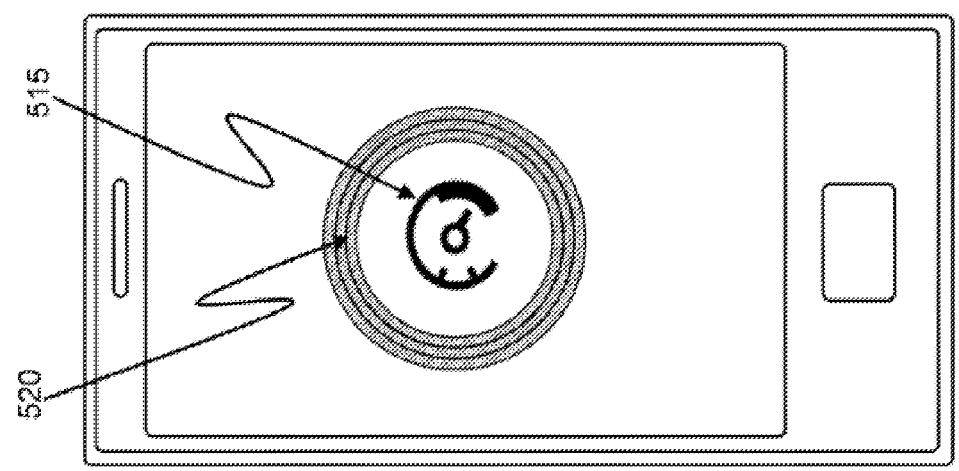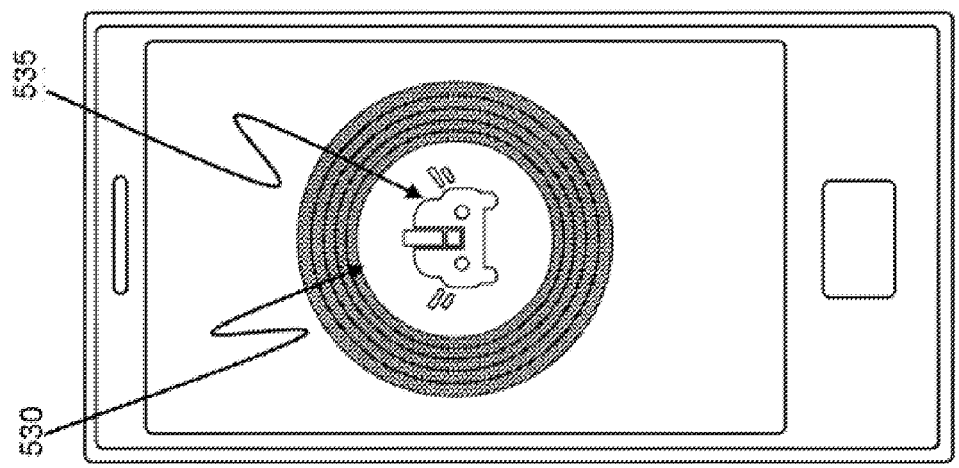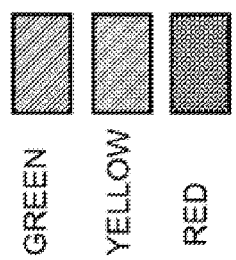
FIG. 5A    FIG. 5B    FIG. 5C

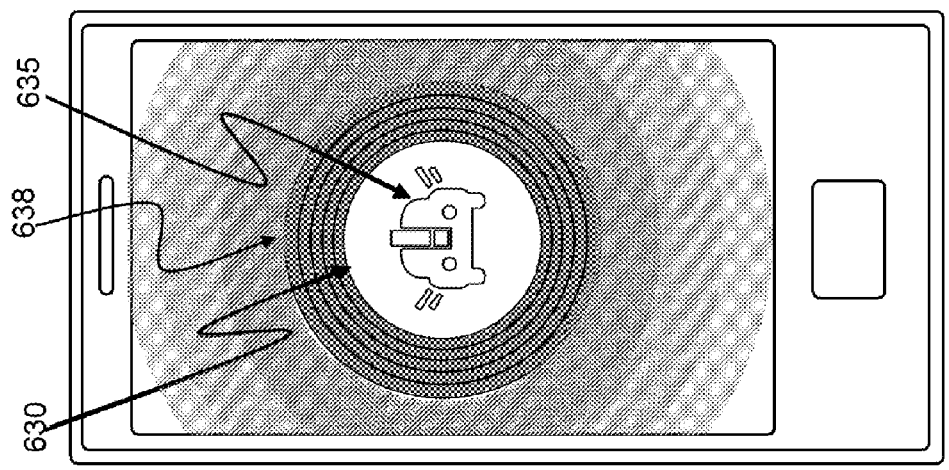
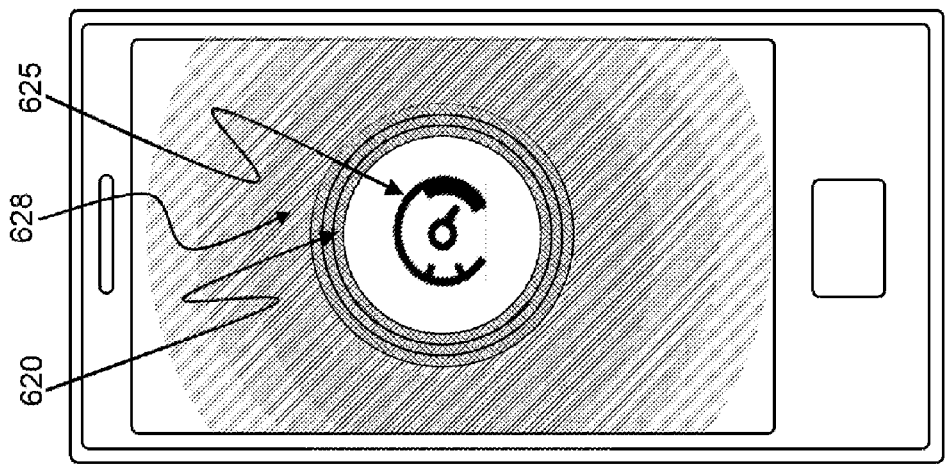
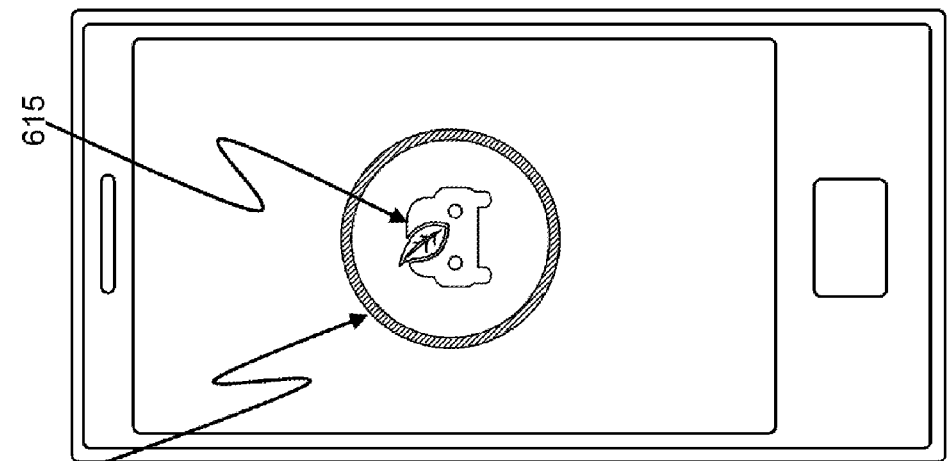
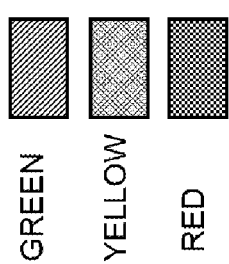
FIG. 6A  FIG. 6B  FIG. 6C

USER INTERFACE FOR DRIVER PERFORMANCE APPLICATION

TECHNICAL FIELD

The present disclosure generally relates to monitoring driving performance, and more particularly to providing visual driving related information to the driver.

BACKGROUND

It is a well-known fact that for safety reasons a driver of a vehicle has to look predominantly onto the road and to observe the traffic in order to refrain from being involved in accidents. Distracted drivers compromise their own life as well as life of other peoples. According to the National Highway Traffic Safety Administration, "Traffic Safety Facts: Distracted Driving 2009", twenty percent of crashes that involved injury in the U.S. during the year 2009, were reported to be associated with distracted driving. There are three main types of distractions:

Visual—the driver takes his eyes off the road;
Manual—the driver takes his hands off the wheel; and
Cognitive—the driver is not fully aware of what he is doing.

Distracted driving activities include certain activities such as engaging in a phone call, texting, and eating. However, also in-vehicle technologies such as navigation systems, driving monitoring systems or driving assistance applications associated with the driver's smart phone may be a source of distraction.

Known driving monitoring systems and driving assistance applications present the driver of a vehicle with information and data which require his/her attention. The present disclosure provides a novel way to present driving performance related information to a driver in a clear and noticeable way, one which minimizes the time the driver needs to look at the display in order to comprehend the information being displayed to him/her before he/she may focus once again on actual driving operations.

SUMMARY OF THE DISCLOSURE

The disclosure may be summarized by referring to the appended claims.

BRIEF DESCRIPTION OF THE DRAWINGS

In the drawings:

FIG. 1A, 1B, 1C are screenshots of a smart phone running an application according to an example, and in particular FIG. 1A is a screenshot illustrating a visual presentation of driving performance "safe driving"; FIG. 1B is a screenshot illustrating a visual presentation of driving performance characterized as "moderate risk driving"; FIG. 1C is a screenshot illustrating a visual presentation of driving performance characterized as "high risk driving";

FIG. 2A, 2B, 2C are screenshots of a smart phone running an application according to another example, and in particular FIG. 2A is a screenshot illustrating a visual presentation of driving performance characterized as "safe driving"; FIG. 2B is a screenshot illustrating a visual presentation of driving performance characterized as "moderate risk driving"; FIG. 2C is a screenshot illustrating a visual presentation of driving performance characterized as "high risk driving";

FIG. 3A is a screenshot illustrating a visual presentation of driving performance characterized as "safe driving"; FIG. 3B is a screenshot illustrating a visual presentation of driving performance characterized as "moderate risk driving"; FIG. 3C is a screenshot illustrating a visual presentation of driving performance characterized as "high risk driving";

FIG. 4A, 4B, 4C are screenshots of a smart phone running an application according to a different example, and in particular FIG. 4A is a screenshot illustrating a visual presentation of driving performance characterized as "safe driving"; FIG. 4B is a screenshot illustrating a visual presentation of driving performance characterized as "moderate risk driving"; FIG. 4C is a screenshot illustrating a visual presentation of driving performance characterized as "high risk driving";

FIG. 5A, 5B, 5C are screenshots of a smart phone running an application according to still another example, and in particular, FIG. 5A is a screenshot illustrating a visual presentation of driving performance while carrying out an speeding driving event; FIG. 5B is a screenshot illustrating a visual presentation of driving performance while carrying out an speeding driving event; FIG. 5C is a screenshot that illustrates a general driving event;

FIG. 6A, 6B, 6C are screenshots of a smart phone running an application according to a different example, and in particular FIG. 6A is a screenshot illustrating a visual presentation of driving performance characterized as "safe driving"; FIG. 6B is a screenshot illustrating a visual presentation of driving performance while carrying out an speeding driving event; FIG. 6C is a screenshot illustrating a visual presentation of driving performance while carrying out a general driving event.

DETAILED DESCRIPTION

Figure 3C:
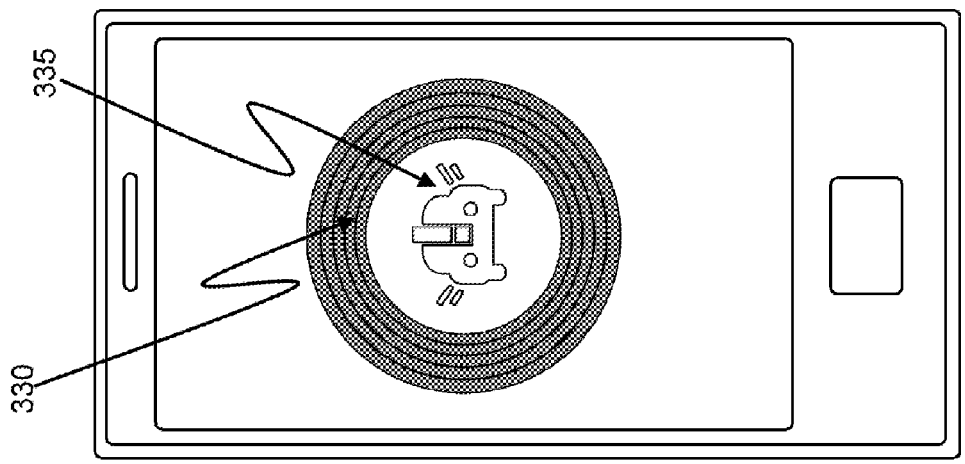
FIG. 3A, 3B, 3C are screenshots of a smart phone running an application according to a yet another example, and in particular

In an embodiment, the disclosure provides a method, an apparatus and a software product to clearly present visual information to a driver driving a vehicle.

In an embodiment, the disclosure provides a method, an apparatus and a software product enabling a driver to easily comprehend real time feedbacks.

In an embodiment, the disclosure provides a method, an apparatus and a software product to monitor the performance of a vehicle driver's and to present to that driver unambiguous information regarding his driving performance.

In an embodiment, the disclosure provides means to observe the driver's performance, providing him with feedbacks for bad and good performance, and preferably reinforce his good driving by providing him with tools to improve his/her driving.

Other features of the disclosure will become apparent as the description proceeds.

According to a first embodiment there is provided a method for providing visual presentation of driving related information (e.g. to a driver), the method comprising:

detecting one or more driving events carried out by a driver of a moving vehicle;
determining performance severity of the one or more driving events;
classifying the one or more driving events according to pre-defined categories based on the respective performance severity of the one or more driving events;
displaying a visual presentation which comprises one or more concentric rings, and wherein the number of the concentric rings provides an indication that relates to recent driving performance of the driver.

The term "driving event" as used herein and throughout the specification and claims is used to denote a driving maneuver detected by identifying and/or recognition of its pre-defined pattern (e.g. as stored in a maneuver library) within a data stream comprising data measured during the movement of the vehicle. Such events can be for example, acceleration, braking, lane change, cornering and speeding, and the like. Further examples of driving events are provided hereinbelow. After detecting a certain driving event, its severity is determined based on several parameters for example the magnitude of the maximal acceleration as measured, the permitted speed in that area and further parameters. The performance severity serves in fact to quantify how well were the one or more driving events executed by the driver. Detecting a driving event may be performed as described in U.S. Pat. No. 7,389,178.

The term "concentric ring" as used herein and throughout the specification and claims is used to denote a 2-D ring shaped object, which comprises the area confined between two concentric geometric shapes. It should be understood that the disclosure is not restricted to area confined between two concentric circles, but also encompasses other shapes such as for example, two concentric ellipses or two concentric squares, and the like.

The term "visual presentation" as used herein through the specification and claims should be understood also to encompass not only a visual display, but also providing an audio indication (for example serving as feedback), which is used to enable the provisioning of information to the driver without making him/her taking his eyes off the road every now and then to see whether the visual presentation being currently displayed has been changed since the last time he/she looked at the display, and/or to enable the driver to look at the display only when certain cases occurred, for example if a certain driving event was badly performed. Once the appropriate audio indication is sound (following a detection of a badly performed event that is also expressed in the visual presentation) the driver may glance at the display to comprehend the findings of the system.

The term "recent" as used in connection with the indication that relates to recent driving performance of the driver, may, as will be appreciated by those skilled in the art to encompass different periods. However, the preferred period of time which is encompassed by the use of this term is in the range of from about the last 5 minutes which the driver has just drove, to about the last 30 minutes which the driver has drove. In any case it is a period measured in minutes (i.e. less than an hour).

According to another embodiment, the number of the concentric rings provides an indication that relates to the number of driving events that were detected within a most recent pre-defined period of time, say with the last 15-20 minutes of the driving session. This allows for example, providing the driver with a feedback which relates to good driving performance. When driving performance improves, this trend may be reflected gradually at the display.

According to yet another embodiment, the number of the concentric rings provides an indication that relates to the performance severity of the one or more detected driving events that were carried recently by the driver.

In accordance with still another embodiment, one or more of the driving events relates to fuel-economy related behavior of the driver, such as idling, etc. and the display of the one or more concentric rings in the visual presentation relates to recent fuel-economy related driving performance of the driver. The visual presentation may be one in which the number of concentric rings reflects a combination of the driver's safety driving performance as well as the driver's fuel economy driving performance of the driver, or in the alternative there could be different displays for each of these two aspects that are changed every pre-determined period of time and/or upon detecting a meaningful change in the driving performance aspect, which is not currently being displayed.

According to another embodiment, the step of determining performance severity is carried out for a plurality of driving events and the number of concentric rings that will be included in the visual presentation is derived from the performance severity classification carried out for the combination of the plurality of driving events, thereby enabling to provide a driver also with a visual presentation of his/her driving trends, such as for example is his/her driving safe? How economic is his/her driving? How risky is his/her driving, etc.

In accordance with yet another embodiment, the visual presentation is displayed in one of a plurality of pre-defined colors, and preferably, the color at which the visual presentation is displayed relates to the way that the recent driving performance as reflected in that display has been carried out. For example, if the visual presentation relates to performance associated with one or more driving events (for example low risk, moderate risk, high risk, etc.) the visual presentation may be displayed at a pre-defined corresponding color (for example green, yellow and red).

According to still another embodiment, the innermost concentric ring (i.e. at the center of the concentric rings) comprises a pre-determined symbol, preferably selected from a plurality of pre-defined symbols, which relates to the severity class of the one or more detected driving events being presented and/or with the type of the one or more detected driving events.

In accordance with another embodiment, the indication that relates to recent driving performance of the driver is used to indicate a trend which characterizes the driving performance within that recent period.

By yet another embodiment, the presentation of the one or more concentric rings takes place for a certain period of time, say between two seconds to one minute, for example 6 seconds or 7.5 seconds. This period of time may be pre-defined, or, preferably may be a configurable period of time.

According to anther embodiment, if during the visual presentation of the performance severity associated with one or more driving events, another driving event has been detected and its performance severity needs to be presented to the driver, then the visual presentation of the performance severity associated with the former one or more driving events is ceased, and a new visual presentation that reflects the performance severity associated with the new one or more driving events, begins. For example, assuming that a typical visual presentation lasts 5.5 seconds, and the first visual presentation is associated with the severity at which the driver has carried out an acceleration driving event. Now, if say, two seconds after the beginning of that first visual presentation, a braking event was detected, the first visual presentation will be replaced with a second visual presentation that reflects the severity of the braking driving event that took place.

According to still another embodiment, all data used for detecting and/or identifying the one or more driving event/driving maneuver is retrieved solely from a mobile wireless device located within a moving vehicle, and the visual presentations are displayed at that mobile wireless device's display.

The term "mobile wireless device" as used herein and throughout the specification and claims is used to denote a device being a member of the group comprising: a smart phone, a cell phone, a portable wireless communication device, a portable Internet device, a mobile navigation device, a portable digital assistant, a tablet computer, a laptop computer, a personal navigation device, and the like. The mobile wireless device does not have to be the driver's own device, and as long as it located within the moving vehicle it can be used to monitor the driver's driving performance.

According to another aspect, there is provided an apparatus adapted to display visual presentations of driving related information, the apparatus comprising:

a multi-axis accelerometer which is capable of measuring a plurality of acceleration vectors along more than a single axis;

a processor adapted to: detect one or more driving events carried out by a moving vehicle, wherein the detection is based on measurements of the plurality of acceleration vectors; determine performance severity of the one or more driving event; classify the one or more driving events according to pre-defined categories based on the respective performance severity of the one or more driving events;

a display operative to provide a visual presentation which comprises one or more concentric rings, and wherein the number of the concentric rings provides an indication that relates to recent driving performance of the driver.

According to another embodiment, the processor is operative to determine performance severity for a plurality of driving events and the number of concentric rings that will be included in a respective visual presentation is derived from the performance severity classification carried out for the combination of the plurality of driving events.

By yet another embodiment, each class by which the one or more driving events are classified by the processor is associated with a pre-defined color in which all of the one or more concentric rings are presented, thereby reflecting the performance severity of the respective one or more driving events.

According to another embodiment, the innermost concentric ring of the visual presentation comprises a pre-determined symbol which relates to the severity class of the one or more detected driving events being presented and/or with the type of the one or more detected driving events.

In accordance with still another embodiment, all data used for detecting the driving event is retrieved by the apparatus when located within a moving vehicle.

As will be appreciated by those skilled in the art, the visual presentation may be displayed at the apparatus screen, occupying the full displaying area of the apparatus, at least until the user wishes to switch to another application. Alternatively, the application that is used to generate the visual presentation runs at the background, while another application—for example navigation application is currently being displayed, in which case, the user will not be able to see the visual presentation all the time, but a relevant visual presentation will be displayed at certain points in time, for example every pre-defined period of time, when a driving event has been detected, etc. By this option, this visual presentation will 'burst' on top of the active application (for example the navigation application) to catch the user's attention. In addition an audio alert may also be generated in order to draw the driver's attention that a change (or specific change(s)) occurred at the display which relates to his/her driving performance.

Other embodiments which relate to the apparatus are described for example with reference to the method embodiments, mutatis mutandis.

According to another aspect, a computer program product encoding a computer program stored on a non-transitory computer readable storage medium for executing a set of instructions by an apparatus comprising one or more computer processors, for carrying out a method for visually presenting driving related information, the method comprising: detecting one or more driving events carried out by a driver of a moving vehicle; determining performance severity of the one or more driving events; classifying the one or more driving events according to pre-defined categories based on the respective performance severity of the one or more driving events; and providing a visual presentation which comprises one or more concentric rings, and wherein the number of the concentric rings provides an indication that relates to recent driving performance of the driver.

In accordance with another embodiment, determining performance severity is carried out for a plurality of driving events and the number of concentric rings that will be included in the visual presentation is derived from the performance severity classification carried out for the combination of the plurality of driving events.

According to still another embodiment of this aspect, the innermost concentric ring comprises a pre-determined symbol which relates to the severity class of the one or more detected driving events being presented and/or with the type of the one or more detected driving events.

In accordance with another embodiment, the computer program product is configured to operate at a mobile wireless device and wherein all data used for detecting the driving event is retrieved from that mobile wireless device when located within a moving vehicle, and the visual presentations are displayed at the mobile wireless device's display.

Other embodiments which relate to the software program are described for example with reference to the method embodiments, mutatis mutandis.

In this disclosure, the term "comprising" is intended to have an open-ended meaning so that when a first element is stated as comprising a second element, the first element may also include one or more other elements that are not necessarily identified or described herein, or recited in the claims. For the purposes of explanation, numerous specific details are set forth in order to provide a thorough understanding of the disclosure. It should be apparent, however, that embodiments may be practiced without these specific details.

In the following description, all of the figures show screenshots of a smart phone running an application according to various embodiments. However, it should be understood that the disclosure is not limited to a method of presenting the driving related information on a smart phone. Any apparatus (for example driving monitoring system) with a display at which such driving related information can be presented, is included within the scope of the disclosure.

The disclosure focuses on visually presenting real time or near real time driving related information to a driver. The driving related information is the result of processing data originated from real-time measurements. However, the disclosure is not limited to any specific way of processing the data retrieved nor to the way data is retrieved, only to the manner in which the information is displayed. One way of retrieving, determining and classifying the driving performance of a driver is disclosed in U.S. Pat. No. 7,389,178, the entire contents of which are hereby incorporated by reference for all purposes as if fully set forth herein.

As will be appreciated by those skilled in the art, the solution provided by the disclosure, such as the display of the visual presentation, may be carried out by an apparatus which such a display is the only type of a display being presented thereat (for example a dedicated apparatus), or can be displayed at an apparatus which is not limited to displaying only visual presentations in accordance with the present disclosure, such as a smartphone, a tablet, and any other applicable mobile devices which are capable of running application (custom) software having output that will be displayed at the device's screen. Among the latter devices, there are also included according to the present disclosure devices which are an integral part of the vehicle's dashboard, and that are preferably adapted to mirror the visual presentation being currently displayed at the screen of the user's smartphone, to a screen comprised in the vehicle's dashboard.

FIGS. 1A, 1B and 1C are screenshots of a smart phone running an application in accordance with an example, where the figures illustrate visual presentations of different classes of driving trends. For example, the visual presentations of different classes of driving trends may reflect the performance severity for a plurality of driving events executed by the driver, and the number of concentric rings that will be included in a respective visual presentation, will be derived in that case from the performance severity classification carried out for the combination of the plurality of driving events.

FIG. 1A illustrates a visual presentation of a "safe driving" performance, wherein 110 is one concentric ring and 115 is a symbol which represents "safe driving" performance. FIG. 1B illustrates a visual presentation of a "moderate risk driving" performance, where 120 are three concentric rings (the less is the number of the concentric rings in this example, the better is the driver's driving performance) and 125 is a symbol representing "moderate risk driving" performance. FIG. 1C illustrates a visual presentation of a "high risk driving" performance, where 130 are now five concentric rings and 135 is a symbol representing "high risk driving" performance. As may easily be seen from the figures, the number of concentric rings increases as the driving performance becomes more risky, consequently by adopting such visual presentation of the driving performance, it is rather easy for the driver to look at the smart phone display for a relatively short period of time, to realize the information being presented to him/her at a glance, and to turn his look away from the smart phone.

FIGS. 2A, 2B and 2C are screenshots of a smart phone running an application similar to the one depicted above. In this embodiment, each concentric ring (210, 220 and 230) is generated from two concentric squares rather than two concentric circles. The symbols (215, 225, and 235) represent the same driving performance as described in connection with FIG. 1.

Figure 3B:
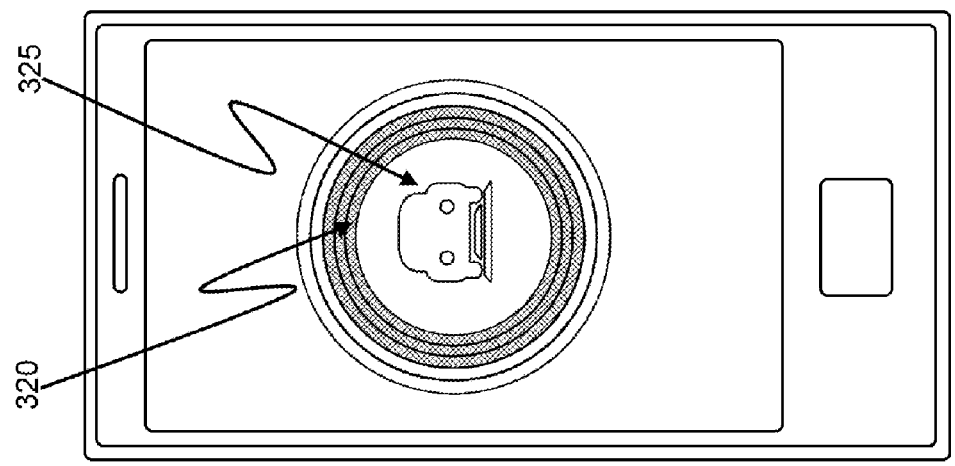
Figure 3A:
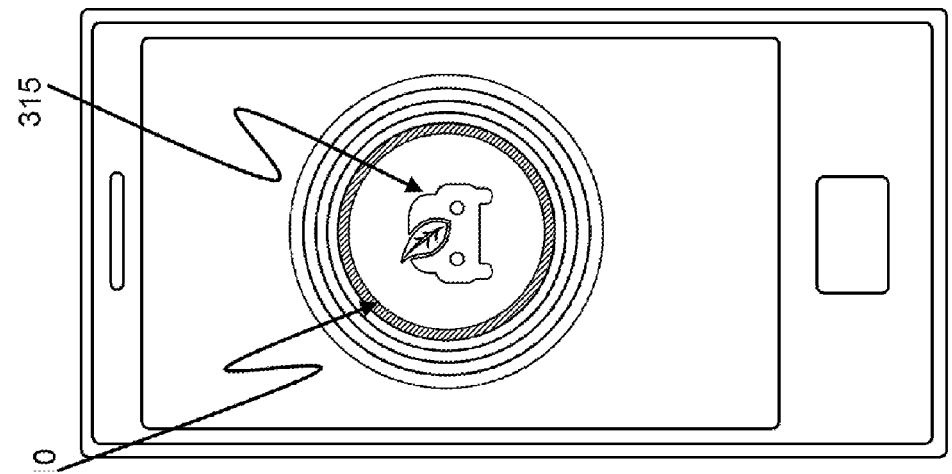

FIGS. 3A, 3B and 3C illustrate further screenshots of a smart phone running an application similar to the one described above. In this embodiment, the visual presentation is a colored presentation. FIG. 3A, which illustrates one concentric ring (310) indicating safe driving is displayed in green. The visual presentation displayed in FIG. 3B, which has three concentric rings (320), indicating moderate risk driving is displayed in yellow, while FIG. 3C where the visual presentation comprise five concentric rings (330), are all colored red. Obviously, these colors should not be understood in any way to limit the scope of the disclosure. The symbols (315, 325, and 335) represent the same driving performances as discussed with reference to FIG. 1.

According to one embodiment, the visual presentation also comprises the maximum possible number of concentric rings. Let us consider FIG. 3B, in which a moderate risk driving performance is presented, based on the concentric rings presentation, the driver is able to note at a glance that his/her current performance is defined as moderate risky, and that his/her driving is characterized at a risk level 3 out of 5 possible risky driving levels.

FIGS. 4A, 4B and 4C illustrate additional screenshots of a smart phone running an application similar to the one described above. These figures show a different way of adding colors to the one or more concentric, according to a different embodiment. FIG. 4A illustrates a visual presentation that comprises one concentric ring (410) colored green. FIG. 4B illustrates a visual presentation that comprises three concentric rings, one (410) colored green and two (420) colored yellow, whereas FIG. 3C illustrates a visual presentation that comprises five concentric rings, one concentric ring (410) colored green, two (420) colored yellow and two (430) colored red. The symbols (415, 425, and 435) represent the same driving performance as illustrated in FIG. 1.

FIGS. 5A, 5B and 5C are further screenshots of a smart phone running an application similar to the one described above. Optionally, or in addition to present the driving performance, embodiments may further present how well/safe (or how unsafe) a specific driving event (for example a maneuver) was executed, thereby providing real time feedback to the driver of the performance of individual driving maneuvers. The following are examples of such driving maneuvers that their performance can be visually presented to the driver, including: acceleration, acceleration before turn, acceleration during lane change, acceleration into turn, acceleration into turn out from rest, acceleration from rest, acceleration out of turn, acceleration while passing, braking, braking after a turn, braking before a turn, stopping, braking out of a turn, braking within a turn, failed lane change, failed passing, lane change, lane change and braking, passing, passing and braking, turning, turning and accelerating, executing a U-turn, fleet speed violation, posted speed violation, speeding over speed bumps, excessive idling, excessive revving, using the phone while driving, texting while driving, making a call while driving, and the like.

FIG. 5A illustrates a visual presentation of an acceleration driving event that has been well executed according to the parameters characterizing such an event, therefore the visual presentation generated by the application comprises only one green ring (510), and the symbol 515 indicates an acceleration event. FIG. 5B illustrates a visual presentation of an acceleration driving event that was executed in not too as safe manner. Accordingly, the application generates three yellow concentric rings (520) which surround the symbol event 515.

FIG. 5C illustrates a visual presentation of an unspecified driving event that is executed in an extremely risky fashion. Accordingly, the application presents five red concentric rings (530). The symbol 535 represents a general driving event. However, according to a different embodiment, every driving event is associated with its own unique symbol.

FIGS. 6A, 6B and 6C illustrate additional screenshots of a smart phone running an application similar to the one described above. In addition to the provisioning of a visual presentation of a specific driving event, the application may provide a flickering glow in the color associated with the classification of the driving event performance. The flickering glow is useful in catching the attention of the driver. FIG. 6A illustrates a presentation of safe driving performance where 610 is a green ring, and 615 is a symbol representing the safe driving performance which the driver may observe prior to detecting the driving event. FIG. 6B illustrates a visual presentation of an acceleration driving event where 620 is three yellow concentric circles, indicating that the event was performed at a somewhat risky mode and 625 is a symbol representing the acceleration driving event, and 628 is a yellow glow that flickers during the presentation of the acceleration driving event at this mode. FIG. 6C illustrates a visual presentation of a general driving event, where 630 is five red concentric rings, 635 is the symbol representing a general driving event, and 638 is a red glow that flickers during the presentation of the performance of the general driving event.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
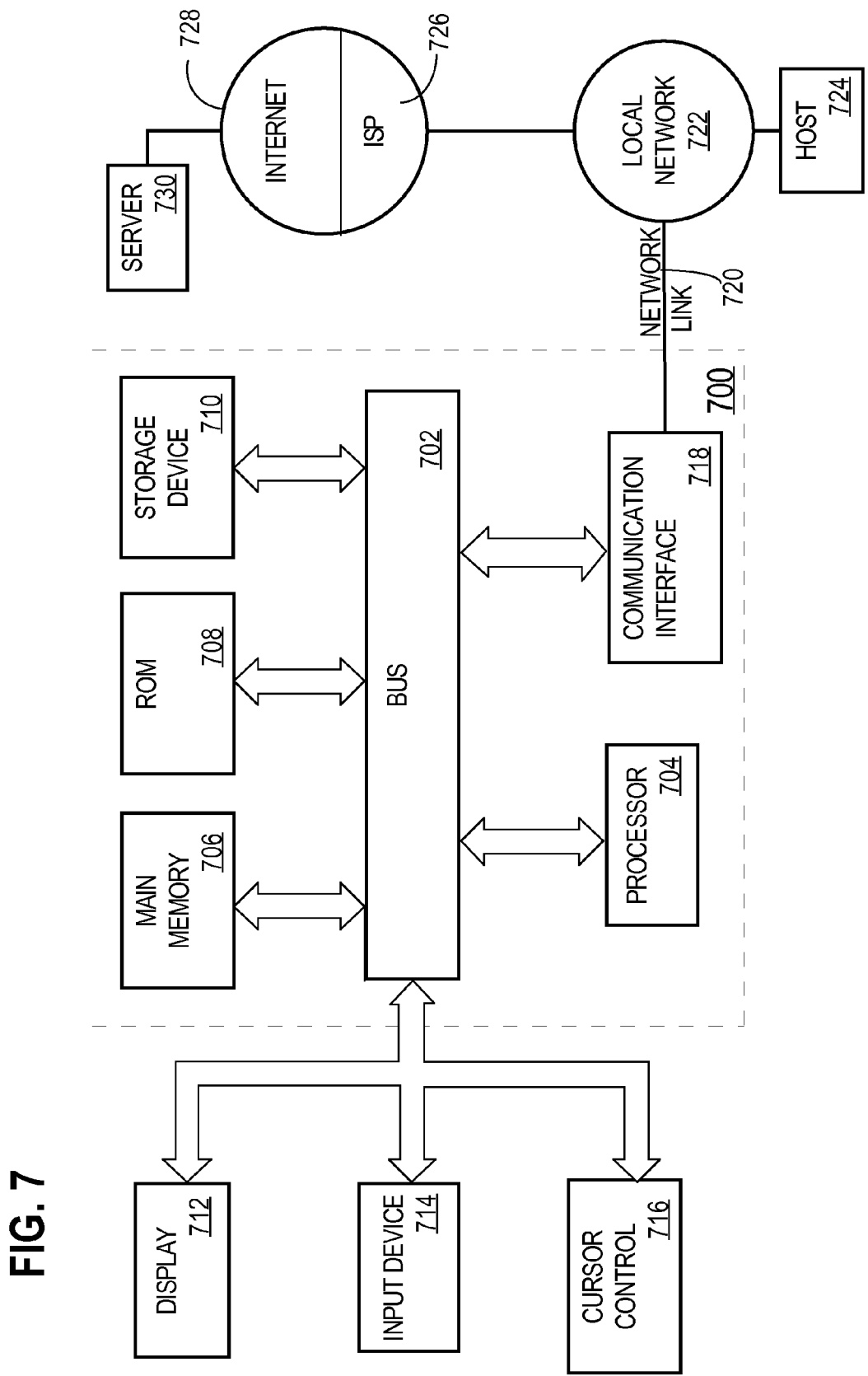
FIG. 7 is a block diagram that illustrates a computer system upon which an embodiment may be implemented.

For example, FIG. 7 is a block diagram that illustrates a computer system 700 upon which an embodiment may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Embodiments have been described using detailed descriptions thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the invention will occur to persons of the art, for example although the apparatus has been described as comprising an accelerometer, a processor and a display, it should be obvious to any skilled person of the art that other components may be involved in carrying out the method described (for example a GPS). Also, even though certain embodiments described hereinabove encompassing a single device such as a smart phone used both for detecting the various driving events, determining their severity and displaying a presentation that relates to the driver's performance, still it should be understood that the scope of the present invention also encompasses cases where the above process is divided between a number of devices, for example one device for detecting and analyzing the driving events and the other for displaying a feedback to the driver. The scope of the invention is limited only by the following claims.

What is claimed is:

1. A method for providing visual presentation of driving related information, the method comprising:
   detecting one or more driving events carried out by a driver of a moving vehicle;
   determining performance severity of the one or more driving events;
   classifying the one or more driving events according to pre-defined categories based on the respective performance severity of the one or more driving events; and
   providing a visual presentation which comprises one or more concentric rings, and wherein the number of the concentric rings provides an indication that relates to recent driving performance of the driver and
   wherein the number of the concentric rings provides an indication that relates to a number of driving events that were detected within a most recent pre-defined period of time;
   and wherein the number of the concentric rings provides an indication that relates to the performance severity of the one or more detected driving events that were carried recently by the driver, wherein the performance severity ranges from "safe driving" to "moderate risk driving" to "high risk driving" performance.

2. The method of claim 1, wherein at least one of the one or more of the driving events relates to fuel-economy related behavior of the driver, and wherein the visual presentation relates to recent fuel-economy related driving performance of the driver.

3. The method of claim 1, wherein the step of determining performance severity is carried out for a plurality of driving events and the number of concentric rings that will be included in the visual presentation is derived from the performance severity classification carried out for the combination of the plurality of driving events.

4. The method according to claim 1, wherein the visual presentation is displayed in one of a plurality of pre-defined colors, and wherein the color at which the visual presentation is currently displayed relates to the driver's recent driving performance as reflected in said visual presentation.

5. The method according to claim 1, wherein the innermost concentric ring comprises a pre-determined symbol which relates to the severity class of the one or more detected driving events being presented and/or with the type of the one or more detected driving events.

6. The method according to claim 1, wherein the indication that relates to recent driving performance of the driver, is used to indicate a trend which characterizes the driving performance within that recent period.

7. The method according to claim 1, wherein the visual presentation takes place for a configurable period of time.

8. The method according to claim 1, wherein all data used for detecting the driving event is retrieved from a mobile wireless device located within the moving vehicle, and the visual presentations are displayed at the mobile wireless device's display.

9. An apparatus adapted to display visual presentations of driving related information, the apparatus comprising:
   (i) a multi-axis accelerometer which is capable of measuring a plurality of acceleration vectors along more than a single axis;
   (ii) a processor adapted to:
     (a) detect one or more driving events carried out by a moving vehicle, wherein the detection is based on measurements of the plurality of acceleration vectors;
     (b) determine performance severity of the one or more driving event; and
     (c) classify the one or more driving events according to pre-defined categories based on the respective performance severity of the one or more driving events;
   (iii) a display operative to provide a visual presentation visual presentation which comprises one or more concentric rings, and wherein the number of the concentric rings provides an indication that relates to recent driving performance of the driver, and wherein the number of the concentric rings provides an indication that relates to a number of driving events that were detected within a most recent pre-defined period of time;
   and wherein the number of the concentric rings provides an indication that relates to the performance severity of the one or more detected driving events that were carried recently by the driver, wherein the performance severity ranges from "safe driving" to "moderate risk driving" to "high risk driving" performance.

10. The apparatus of claim 9, wherein at least one of the one or more of the driving events relates to fuel-economy related behavior of the driver, and wherein the visual presentation relates to recent fuel-economy related driving performance of the driver.

11. The apparatus of claim 9, wherein the innermost concentric ring of the visual presentation comprises a pre-determined symbol which relates to the severity class of the one or more detected driving events being presented and/or with the type of the one or more detected driving events.

12. The apparatus of claim 9, wherein all data used for detecting the driving event is retrieved by said apparatus when located within the moving vehicle.

13. A computer program product encoding a computer program stored on a non-transitory computer readable storage medium for executing a set of instructions by an apparatus comprising one or more computer processors, for carrying out a method for visually presenting driving related information, the method comprising: detecting one or more driving events carried out by a driver of a moving vehicle; determining performance severity of the one or more driving events; classifying the one or more driving events according to pre-defined categories based on the respective performance severity of the one or more driving events; and providing a visual presentation which comprises one or more concentric rings, and wherein the number of the concentric rings provides an indication that relates to recent driving performance of the driver, and
  wherein the number of the concentric rings provides an indication that relates to a number of driving events that were detected within a most recent pre-defined period of time;
  and wherein the number of the concentric rings provides an indication that relates to the performance severity of the one or more detected driving events that were carried recently by the driver, wherein the performance severity ranges from "safe driving" to "moderate risk driving" to "high risk driving" performance.

14. The computer program product of claim 13, wherein at least one of the one or more of the driving events relates to fuel-economy related behavior of the driver, and wherein the visual presentation relates to recent fuel-economy related driving performance of the driver.

* * * * *